United States Patent [19]

Eichenauer et al.

[11] Patent Number: 5,066,717

[45] Date of Patent: Nov. 19, 1991

[54] THERMOPLASTIC MOULDING COMPOUNDS BASED ON AROMATIC POLYCARBONATES AND VINYL POLYMERS WITH IMPROVED THERMOSTABILITY

[75] Inventors: Herbert Eichenauer, Dormagen; Dieter Wittmann; Adolf Schmidt, both of Cologne; Karl-Heinz Ott, Leverkusen, all of Fed. Rep. of Germany

[73] Assignee: Bayer Aktiengesellschaft, Leverkusen, Fed. Rep. of Germany

[21] Appl. No.: 511,680

[22] Filed: Apr. 20, 1990

[30] Foreign Application Priority Data

Apr. 25, 1989 [DE] Fed. Rep. of Germany ....... 3913507

[51] Int. Cl.$^5$ .................. C08L 69/00; C08L 51/06; C08L 20/00; C08F 2/26
[52] U.S. Cl. .................................. 525/67; 525/146; 525/148; 525/262; 526/216

[58] Field of Search ............... 525/67, 146, 148, 262; 526/216

[56] References Cited

U.S. PATENT DOCUMENTS

| | | | |
|---|---|---|---|
| 3,873,641 | 3/1975 | Margotte | 525/148 |
| 4,490,506 | 12/1984 | Sakano | 525/67 |
| 4,526,926 | 7/1985 | Weber | 525/146 |
| 4,937,285 | 6/1990 | Wittmann | 525/67 |

*Primary Examiner*—John C. Bleutge
*Assistant Examiner*—David Buttner
*Attorney, Agent, or Firm*—Joseph C. Gil; Aron Preis

[57] ABSTRACT

This invention relates to thermostable thermoplastic moulding compounds consisting of a thermoplastic aromatic polycarbonate resin, a graft polymer and optionally a thermoplastic vinyl polymer wherein the graft or vinyl polymer is emulsion polymerized with an emulsifier which is the reaction product of 2 mols of certain carboxylic anhydrides and 1 mole of certain diols.

3 Claims, No Drawings

THERMOPLASTIC MOULDING COMPOUNDS BASED ON AROMATIC POLYCARBONATES AND VINYL POLYMERS WITH IMPROVED THERMOSTABILITY

This invention relates to thermostable thermoplastic moulding compounds consisting of a thermoplastic aromatic polycarbonate resin, a graft polymer and optionally a thermoplastic vinyl polymer.

Polymers which can be processed thermoplastically, especially those which contain graft rubbers as toughness modifiers, tend to undergo undesirable discolourations when processed at high temperatures, with the result that the surface of the moulded products obtained is impaired. Such discolourations may generally be reduced by the addition of suitable stabilizers (see e.g. EP-PS 176 811) but a permanent "residual discolouration" which increases with increasing processing temperature always remains, especially when polymers produced by emulsion polymerisation, such as polymers of aromatic vinyl compounds and acrylonitrile, e.g. styrene/acrylonitrile copolymers, or graft polymers such as styrene and acrylonitrile on polybutadiene, are included as components of the mixture used for the preparation of the moulding compounds.

It has been found that mixtures of aromatic polycarbonates and vinyl polymers can be obtained with very high thermostability if special compounds are used as emulsifiers for the preparation of the vinyl polymers by emulsion polymerisation.

This invention relates to thermostable thermoplastic moulding compositions of

A) from 95% to 10% by weight, preferably from 90% to 10% by weight, most preferably from 85% to 25% by weight, of a thermoplastic aromatic polycarbonate or of a mixture of several aromatic polycarbonates and B) from 5% to 90% by weight, preferably from 10% to 90% by weight most preferably from 15% to 75% by weight, of a mixture of Ba) from 100 to 0 parts by weight, preferably from 100 to 20 parts by weight, most preferably from 100 to 30 parts by weight, of one or more graft polymers and Bb) from 0 to 100 parts by weight, preferably from 0 to 80 parts by weight, most preferably from 0 to 70 parts by weight, of one or more thermoplastic vinyl copolymers, wherein polymers Ba and/or Bb are prepared by emulsion polymerisation using emulsifiers which have been obtained by melting together 1 mol of a diol corresponding to formula I

HO—M—OH     I wherein
M =

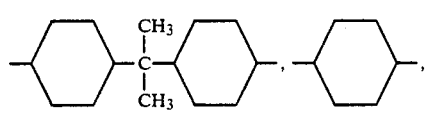, ,

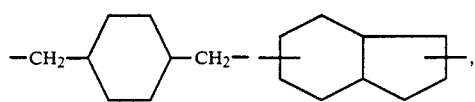,

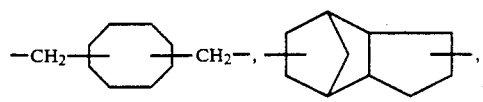

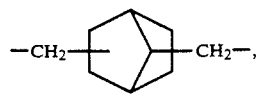

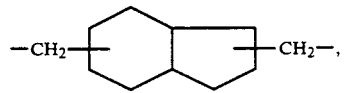

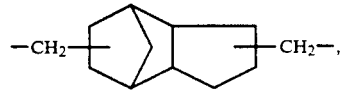

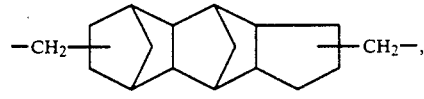

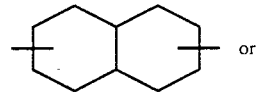 or

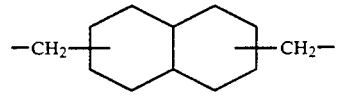

with 2 mols of carboxylic acid anhydride corresponding to formula II and/or III and/or IV

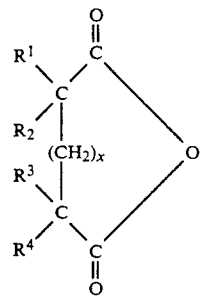

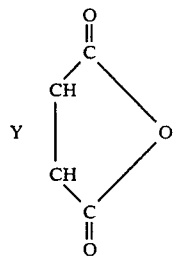

-continued

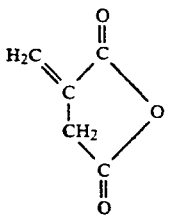
IV in which, when
x=0,
$R^1$, $R^2$, $R^3$ and $R^4$ denote hydrogen or
$R^1$ and/or $R^3$ denote $C_1$ to $C_{35}$-alkyl or alkenyl and $R^2$ and $R^4$ and optionally $R^1$ or $R^3$ denote hydrogen or
$R^1$ and $R^4$ together form a chemical bond and $R^2$ and $R^3$ denote hydrogen or
$R^1$ and $R^4$ denote a chemical bond and $R^2$ and $R^3$ together with the carbon atoms form an o-phenylene group, and when x=1,
$R^1$, $R^2$, $R^3$, $R^4$ denote hydrogen and

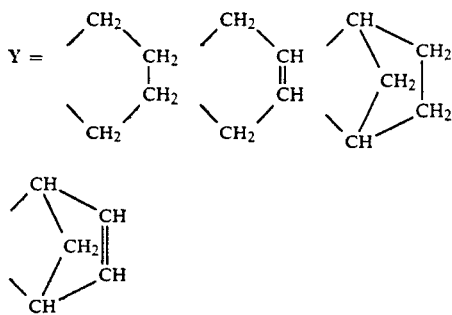

at temperatures from 100° to 300° C., preferably from 120° C. to 220° C. under an inert gas, followed by conversion of the products into alkali metal salts or ammonium salts.

Thermoplastic, aromatic polycarbonates A suitable for the present invention include those based on diphenols corresponding to formula (V)

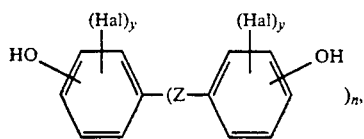

wherein Z denotes a single bond, a $C_1$-$C_5$-alkylene group, a $C_2$-$C_5$-alkylidene group, a $C_5$-$C_6$ cycloalkylidene group, S or $SO_2$, Hal denotes chlorine or bromine, y stands for 0, 1 or 2 and n stands for 1 or 0 and optionally based on diphenols corresponding to formula (Va)

stands for an integer with a value from 5 to 100, preferably from 20 to 80.

The polycarbonates A suitable for this invention are homopolycarbonates or copolycarbonates and the diphenols of formula (Va) are used only for the preparation of copolycarbonates with the diphenols of formula (V) and their proportion by weight in the copolycarbonates amounts to 1 to 20% by weight, preferably 1.5 to 15% by weight, most preferably 2 to 10% by weight, based on the total weight of the diphenols of formulae (V) and (Va).

Component A may also consist of mixtures of the above defined thermoplastic polycarbonates if they are mixtures with polydiorganosiloxanes-polycarbonate block copolymers, and the proportion by weight of the diphenols (Va), based on the total sum of the diphenols in the polycarbonate mixture, is from 1 to 20% by weight.

The polycarbonates A suitable for the purpose of this invention are known. They may be prepared, for example, from the diphenols and phosgene by phase interface polycondensation or from the diphenols and phosgene by the homogeneous phase process, ("pyridine process"), and the molecular weight may be adjusted in known manner by known chain terminating agents (for polycarbonates containing polydiorganosiloxanes, see DE-OS 3 334 873).

The following are examples of suitable chain terminators: Phenol, p-chlorophenol, p-tert.-butylphenol, 2,4,6-tribromophenol, long chain alkyl phenols such as 4-(1,3-tetramethylbutyl)-phenol according to DE-OS 2 842 005 and monoalkylphenols and dialkylphenols having a total of 8 to 20 carbon atoms in the alkyl substituents according to DE-OS 3 506 472, such as 3,5-di-tert.-butylphenol, p-iso-octylphenol, p-tert.-octylphenol, p-dodecylphenol, 2-(3,5-dimethylheptyl)-phenol and 4-(3,5-dimethyl-heptyl)-phenol.

The quantity of chain terminating agents to be used is generally from 0.5 mol-% to 10 mol-%, based on the sum of the diphenols (V) and optionally (Va) put into the process.

The polycarbonates A suitable for this invention have average molecular weights $\overline{M}w$ (weight average, determined, for example, by ultracentrifugation or by scattered light measurement) of from 10,000 to 200,000, preferably from 20,000 to 80,000.

The following are examples of suitable diphenols of formula (V): Hydroquinone, resorcinol, 4,4'-dihydroxydiphenyl, 2,2-bis-(4-hydroxyphenyl)-propane, 2,4-bis((4-hydroxyphenyl)-2-methylbutane, 1,1-bis-(4-hydroxyphenyl)cyclohexane, 2,2-bis-(3-chloro-4-hydroxyphenyl)-propane, 2,2-bis-(3,5-dichloro-4-hydroxyphenyl)-propane and 2,2-bis(3,5-dibromo-4-hydroxyphenyl)-propane.

The following are preferred diphenols corresponding to formula (V): 2,2-Bis-(4-hydroxyphenyl)-propane,

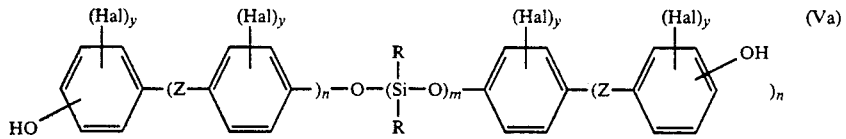

wherein Z, Hal, y and n have the meanings indicated for formula (V) and the groups R may be identical or different and denote straight chained $C_1$-$C_{20}$-alkyl, branched $C_3$-$C_{20}$-alkyl or $C_6$-$C_{20}$-aryl, preferably $CH_3$, and m 2,2-bis-(3,5-dichloro-4-hydroxyphenyl)-propane and 1,1-bis-(4-hydroxyphenyl)-cyclohexane.

Suitable diphenols of formula (Va) include those in which R stands for methyl, ethyl, propyl, n-butyl, tert.-butyl or phenyl.

Preferred diphenols of formula (Va) are those corresponding to formula (Vb)

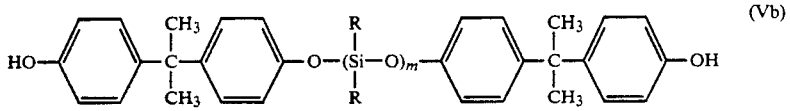

(Vb)

wherein the groups R are identical and have the meanings already mentioned, i.e. preferably methyl, etc. or phenyl, and m denotes an integer with a value from 5 to 100, preferably from 20 to 80.

The diphenols corresponding to formula (Va) may be prepared from the corresponding bis-chloro compounds (VI)

(VI)

and the diphenols (V), for example according to U.S. Pat. No. 3,419,634 in combination with U.S. Pat. No. 3,189,662.

In the bischloro compounds (VI), R and m have the same meanings as in the diphenols of formulae (Va) and (Vb).

The polycarbonates A suitable for this invention may be branched in known manner, preferably by the incorporation of from 0.05 to 2.0 mol-%, based on the sum of diphenols, of trifunctional or higher than trifunctional compounds, for example compounds containing three or more than three phenolic groups.

The preferred polycarbonates include not only bisphenol-A homopolycarbonate but also the copolycarbonates of bisphenol-A with up to 15 mol-%, based on the molar sums of diphenols, of 2,2-bis-(3,5-dibromo-4-hydroxyphenyl)propane or the copolycarbonates of diphenols of formula (V) with 1 to 20% by weight of diphenols of formula (Va);

preferably of formula (Vb), based on the sum of the weights of diphenols (V) and (Va) or (V) and (Vb).

Suitable graft polymers Ba include those in which styrene, α-methylstyrene, methylmethacrylate or a mixture of 95 to 50% by weight of styrene, α-methylstyrene, styrene substituted in the nucleus, methyl methacrylate or mixtures thereof and 5 to 50% by weight of acrylonitrile, methacrylonitrile, maleic acid anhydride, N-substituted maleiimide, methyl methacrylate or mixtures thereof (graft superstrate) have been grafted on a rubber having a glass temperature of $T_g \leq 0°$ C. (graft base).

Rubbers suitable for the preparation of the graft polymers Ba include in particular polybutadiene, butadiene/styrene copolymers (both of which may be copolymerised with up to 30% by weight, based on the weight of the rubber, of a lower alkyl ester of acrylic or methacrylic acid, such as methyl methacrylate, ethyl acrylate, methyl acrylate or ethyl methacrylate), polyisoprene, polychloroprene and alkylacrylate rubbers (of $C_1$-$C_8$-alkyl acrylates, in particular ethyl, butyl and ethylhexyl acrylate). The alkyl acrylate rubbers may contain up to 30% by weight, based on the weight of the rubber, of monomers such as vinyl acetate, acrylonitrile, styrene, methylmethacrylate and/or vinyl ether incorporated by copolymerisation as well as minor quantities, preferably up to 5% by weight, based on the weight of the rubber, of ethylenically unsaturated monomers which have a crosslinking action. Examples of such cross-linking agents include alkylenediol -di(meth-)acrylates, polyester di-(meth)acrylates, divinylbenzene, trivinylbenzene, triallylcyanurate, allyl(meth)acrylate, butadiene and isoprene. The acrylate rubbers may also be of the type which contain a cross linked diene rubber of one or more conjugated dienes and optionally an ethylenically unsaturated monomer such as styrene and/or acrylonitrile as nucleus. Other suitable rubbers include, for example, EPDM rubbers, i.e. rubbers of ethylene, propylene and an unconjugated diene, as well as silicone rubbers.

Diene rubbers and alkyl acrylate rubbers are preferred rubbers for the preparation of graft polymers Ba.

Acrylate rubbers are particularly advantageous when they have a core/sheath structure, i.e. when they contain a core of some other polymer surrounded by a shell of cross-linked alkylacrylate rubber.

The rubbers are present in the graft polymer Ba in the form of at least partially cross-linked particles having an average particle size of from 0.05 to 5 μm, in particular from 0.075 to 1 μm, and they preferably have gel contents of at least 70% by weight. The rubber content in the graft polymer Ba is from 5 to 9% by weight, preferably from 20 to 90% by weight.

The graft polymers Ba are prepared by radical graft polymerisation in emulsion of the monomer mixtures mentioned above in the presence of these rubbers.

The graft superstrate of the graft product Ba of the abovementioned polymer mixtures is produced, for example, by the polymerisation of the corresponding monomers in the presence of a latex (emulsion) of the graft base. This polymerisation may be initiated by radical initiators, e.g. persulphates, peroxides, percarbonates or peresters, especially by water-soluble initiators such as persulphates or by redox initiator systems. These polymerisation processes are known.

Preferred graft superstrates are obtained by the graft polymerisation of a monomer mixture of from 50 to 95 parts by weight of styrene, α-methylstyrene, styrene substituted in the nucleus, methyl methacrylate or mixtures thereof and from 50 to 5 parts by weight of (meth)acrylonitrile, methyl methacrylate, maleic acid anhydride, N-substituted maleiimide or mixtures thereof.

Preferred copolymers Bb include those of styrene, α-methylstyrene, styrene substituted in the nucleus or mixtures of these with acrylonitrile, methacrylonitrile, methylmethacrylate, maleic acid anhydride, N-substituted maleiimide or mixtures thereof.

Thermoplastic copolymers having a composition according to Bb are frequently formed as by-products of the graft polymerisation carried out for the preparation of component Ba, especially when large quantities of monomers are grafted on small quantities of rubber.

The quantity of copolymer Bb amounting to 0 to 80 parts by weight, preferably 0 to 70 parts by weight, based on 100 parts by weight of A+Ba+Bb, does not include this by-product of graft polymerisation.

The copolymers Bb are resinous, thermoplastic and free from rubber. Particularly preferred copolymers Bb are those of styrene and/or α-methylstyrene with acrylonitrile and optionally with methylmethacrylate.

Halogenostyrenes and p-methylstyrene are examples of styrenes substituted in the nucleus.

Particularly preferred ratios by weight in the thermoplastic copolymer Bb are from 60 to 80% by weight of styrene and/or α-methylstyrene and from 40 to 20% by weight of acrylonitrile or methyl methacrylate.

The copolymers Bb are known and may be prepared by radical polymerisation, in particular by emulsion, suspension, solution or mass polymerisation. The copolymers Bb preferably have molecular weights $\overline{M}w$ (weight average, determined by light scattering or sedimentation) of form 15,000 to 200,000 and limiting viscosities of from 20 to 110 ml/g (determined in dimethylformamide at 25° C.)

The emulsifiers used for the preparation of the vinyl polymers Ba and/or Bb are obtained by melting together 1 mol of an cycloaliphatic diol (formula I) or of a mixture of such diols

HO—M—OH     I wherein

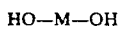

M = 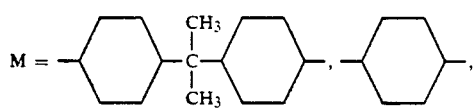

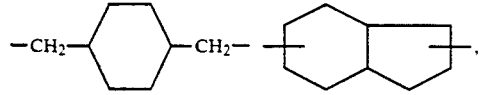

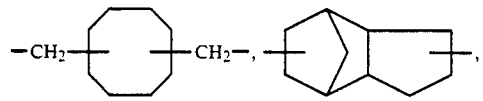

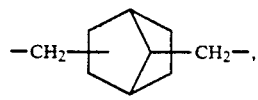

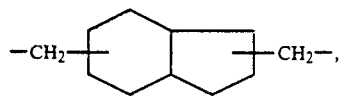

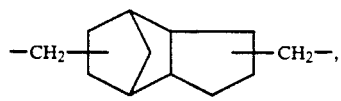

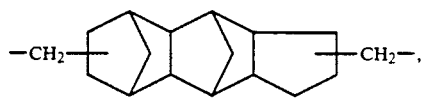

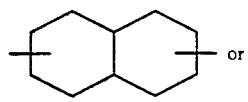 or

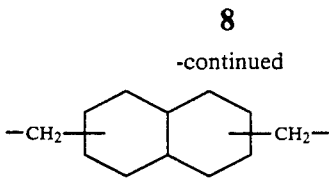

with 2 mol of cycloaliphatic anhydride (formula II, III or IV) or of an anhydride mixture

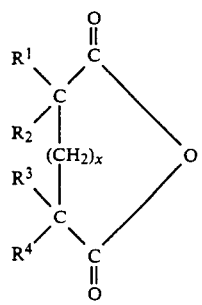
II

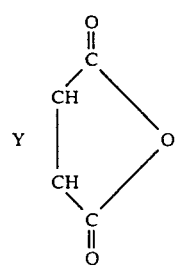
III

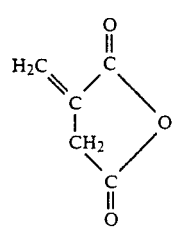
IV in which, when
x=0,
R¹, R², R³ and R⁴ denote hydrogen or
R¹ and/or R³ denote C₁ to C₃₅-alkyl or alkenyl and R² and R⁴ and optionally R¹ or R³ denote hydrogen or
R¹ and R⁴ together form a chemical bond and R² and R³ denote hydrogen or
R¹ and R⁴ denote a chemical bond and R² and R³ together with the carbon atoms represent an o-phenylene group and when x=1,
R¹, R², R³, R⁴ denote hydrogen and Y = 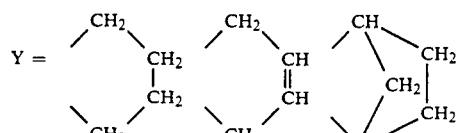

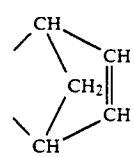

at temperatures from 100° C. to 300° C., preferably from 120° C. to 220° C., under an inert gas, preferably nitrogen, followed by conversion of the reaction product into alkali metal salts or ammonium salts by dissolving the acid reaction products in an aqueous alkali metal solution or an aqueous ammonia solution.

The following are mentioned as examples of suitable diols: 2,2-Bis-(4-hydroxycyclohexyl)-propane; 1,4-cyclohexanediol; 1,4-bis-hydroxymethyl-cyclohexane; bis-hydroxymethylhexahydro-4,7-methanoindane (commercially obtainable as "TDC-Diol" prepared by hydroformylation of dicyclopentadiene), bis-hydroxymethyl-bicyclo-(4,3,0) nonane; bis-hydroxymethyl-norbornane and bis-hydroxymethylcyclooctane.

Most of the diols mentioned above are isomeric mixtures. The following are examples of suitable anhydrides: Hexahydrophthalic acid a-nhydride, tetrahydrophthalic acid anhydride, 5-norbornene-2,3-dicarboxylic acid anhydride, norbornane dicarboxylic acid anhydride, maleic acid anhydride and itaconic acid anhydride.

The last two anhydrides mentioned are preferably reacted with the above-mentioned diols in combination with saturated anhydrides.

The reaction which takes place when the components are melted together is as follows:

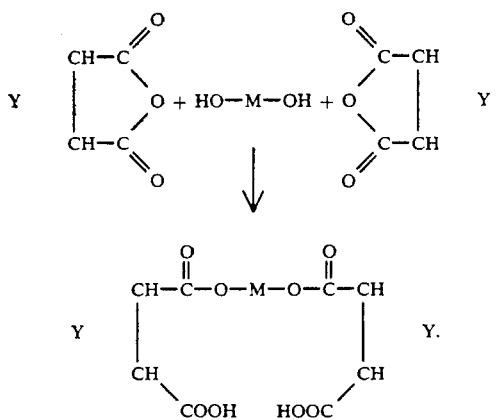

After neutralization with alkali metal hydroxide or aqueous ammonia, the emulsifiers are present in the form of the salts corresponding to the following formula:

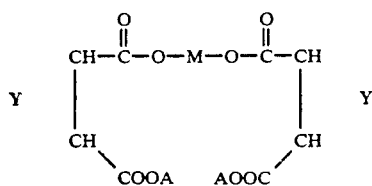

where A=alkali metal, preferably Na and/or K, or ammonium.

The emulsifiers are used for the preparation of vinyl polymers Ba and/or Bb by emulsion polymerisation. They are preferably used for the preparation of the graft rubber component Ba and may be used as well for the preparation of the rubber component, preferably polybutadiene as for the grafting reaction, preferably the emulsion polymerisation of mixtures of styrene and acrylonitrile or of methyl methyl methacrylate in the presence of polybutadiene lattices.

The moulding compounds according to the invention may contain conventional additives such as pigments, fillers, stabilizers, antistatic agents, lubricants, mould release agents, flame retardants and the like.

The following are preferred flame retardants: Phosphorus compounds such as tributylphosphate, tris-(2-chloroethyl)-phosphate, tris-(2,3-dibromopropyl)phosphate, triphenylphosphate, tricresylphosphate, diphenylcresylphosphate, diphenyloctylphosphate, diphenyl-2-ethylcresylphosphate, tri-(isopropylphenyl)phosphate, halogen substituted arylphosphates, methanephosphonic acid dimethylester, methanephosphonic acid diphenylester and phenyl phosphonic acid diethylester, preferably in combination with tetrafluoroethylene polymers having fluorine contents of from 65 to 76% by weight, e.g. polytetrafluoroethylene, tetrafluoroethylene-hexafluoropropylene copolymers or tetrafluoroethylene copolymers containing small quantities of copolymerisable, ethylenically unsaturated monomers which are free from fluorine. Organic halogen compounds such as decabromodiphenylether, octabromodiphenyl, octabromodiphenylether or tri-bromotetrachlorotoluene and oligomeric bromine compounds such as oligo carbonates based on tetrabromobisphenol-A as well as polymeric bromine compounds such as high molecular weight polycarbonates based on tetrabromobisphenol-A or polyphenylene oxides brominated in the nucleus may also be used.

The moulding compositions according to the invention are processed by the methods conventionally used for thermoplasts, e.g. injection moulding, to yield shaped articles such as housing parts for domestic appliances and electrical apparatus, profile parts, internal fittings of motor vehicles, films and other products.

The mouldings obtained as final products are distinguished by their very good surface properties, such as their light intrinsic colour and their good gloss. The mechanical properties, such as impact strength and dimensional stability under heat, are not impaired and are in some cases even improved.

EXAMPLES

Polymer components put into the process

A) Styrene/acrylonitrile (SAN)=72:28 - copolymer having an $\overline{M}w$ of about 80,000 and $\overline{M}w/\overline{M}n$ of $1 \leq 2$ B) Aromatic polycarbonate of 2,2-bis-(4-hydroxyphenyl)propane (bisphenol-A) having a relative viscosity of 1.26 (determined in $CH_2Cl_2$ at 25° C. in the form of a 0.5% by weight solution)

C) Graft rubber obtained by the following method: 50 Parts by weight of polybutadiene (in the form of a latex prepared with the aid of an emulsifier corresponding to the following formula:

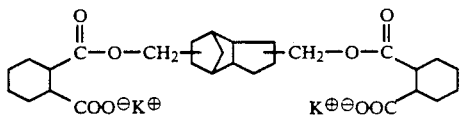

solids content 25% by weight, average particle diameter $d_{50}$=400 nm) are heated to 63° C. under nitrogen and 0.5 parts by weight of $K_2S_2O_8$ (dissolved in 15 parts by weight of water) are added. A mixture of 36 parts by weight of styrene and 14 parts by weight of acrylonitrile and 1.5 parts by weight of the sodium salt of disproportionated abietic acid (dissolved in 15 parts by weight of water) are then added within 4 hours, during which the grafting reaction takes place. At the end of an after-reaction times the latex is coagulated in a magnesium sulphate/acetic acid solution and the resulting powder is dried under vacuum at 70° C.

D) Graft rubber obtained by the following method: 50 parts by weight of polybutadiene (in the form of a latex prepared with the aid of an emulsifier corresponding to the following formula:

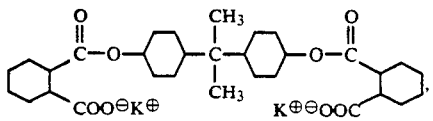

solids content 25% by weight, average particle diameter $d_{50}=100$ nm) are grafted with a mixture of 36 parts by weight of styrene and 14 parts by weight of acrylonitrile as described under (C) and worked up.

E) Graft rubber obtained by the following method: 50 Parts by weight of polybutadiene (in the form of a latex prepared with the aid of the sodium salt of disproportionated abietic acid, solids content 25% by weight, average particle diameter $d_{50}=400$ nm) are grafted with a mixture of 36 parts by weight of styrene and 14 parts by weight of acrylonitrile as described under (C) but 1.5 parts by weight of the compound corresponding to the following formula

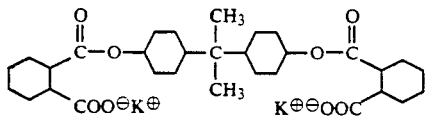

is used as emulsifier instead of the sodium salt of disproportionated abietic acid. The product is worked up by a method analogous to that used for the preparation of (C).

F) Graft rubber obtained by the following method: 50 Parts by weight of polybutadiene(in the form of the latex also used for the preparation of graft, rubber (D))are grafted with a mixture of 36 parts by weight of styrene and 14 parts by weight of acrylonitrile as described under (E) and worked up.

G) Graft rubber obtained by the following method: 50 Parts by weight of polybutadiene in the form of the latex also used for the preparation of graft rubber (C)) are grafted with a mixture of 36 parts by weight of styrene and 14 parts by weight of acrylonitrile as described under (C) but 1.5 parts by weight of the compound corresponding to the following formula

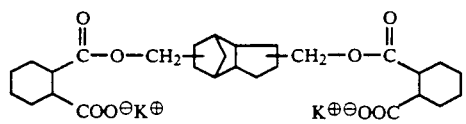

are used as emulsifier instead of the sodium salt of disproportionated abietic acid. The product is worked up by a method analogous to that used for the preparation of (C).

H) Graft rubber obtained by the following method (comparison): 50 Parts by weight of polybutadiene (in the form of a latex which has been prepared with the aid of the sodium salt of disproportionated abietic acid, solids content 25% by weight, average particle diameter $d_{50}=400$ nm) are grafted with a mixture of 36 parts by weight of styrene and 14 parts by weight of acrylonitrile as described under (C) and worked up.

EXAMPLES 1 TO 5 (ACCORDING TO THE INVENTION) AND 6 (NOT ACCORDING TO THE INVENTION)

The polymer components described above were mixed together at 200° C. in the parts by weight shown in Table 1, using an internal kneader. The material obtained was granulated and worked up by injection moulding at 260° C. to form sample bodies which were used for determining the notched impact strength (ISO 180 A) and the dimensional stability under heat Vicat B (DIN 53 460). The thermostability was assessed after processing at 290° C. by comparing the raw tones on planar plates measuring 60×40×2 mm.

Determination of the thermoplastic processing properties was carried out by measuring the filling pressure (see F. Johannaber, Kunststoffe 74 (1984), 1, pages 2-5).

The compositions of the moulding compounds investigated and the test data obtained are summarized in Table 1. Compared with the product obtained in the Comparison Experiment, the products obtained according to the invention have substantially improved thermostabilities and generally have better processing properties and higher dimensional stabilities under heat.

TABLE 1

| | | | | | | | | | | | | | |
|---|---|---|---|---|---|---|---|---|---|---|---|---|---|
| Compositions and test data of the moulding compounds | | | | | | | | | | | | | |
| Example No. | A Parts by wt. | B Parts by wt. | C Parts by wt. | D Parts by wt. | E Parts by wt. | F Parts by wt. | G Parts by wt. | H Parts by wt. | RT $a_k$ (kJ/m$^2$) | −40° C. $a_k$ (kJ/m$^2$) | Vicat B (°C.) | Filling pressure (260° C.) bar | Thermo-stability* |
| 1 | 16 | 60 | 24 | — | — | — | — | — | 67 | 54 | 120 | 64 | 1 |
| 2 | 16 | 60 | — | 24 | — | — | — | — | 52 | 48 | 122 | 65 | 1 |
| 3 | 16 | 60 | — | — | 24 | — | — | — | 57 | 56 | 123 | 73 | 2 |
| 4 | 16 | 60 | — | — | — | 24 | — | — | 59 | 55 | 123 | 65 | 1 |
| 5 | 16 | 60 | — | — | — | — | 24 | — | 54 | 54 | 122 | 83 | 1 |
| 6 (Comparison) | 16 | 60 | — | — | — | — | — | 24 | 53 | 37 | 120 | 84 | 3–4 |

*1 = very light raw tone
2 = light raw tone
3 = yellowish raw tone
4 = yellow raw tone

We claim:

1. Thermoplastic moulding compounds of
   A) from 95–10% by weight of a thermoplastic aromatic polycarbonate or of a mixture of several aromatic polycarbonates and
   B) from 5 to 90% by weight of a mixture of Ba) form 100 to 0 parts by weight of one or more graft polymers containing a graft base of a rubber having a Tg≦0° C. and Bb) from 0 to 100 parts by weight of one or more thermoplastic vinyl copolymers, wherein the emulsifiers used for the preparation of polymers Ba and/or Bb by emulsion polymerisation are compounds which have been obtained by melting together 1 mol of a diol corresponding to formula I

HO—M—OH    I wherein

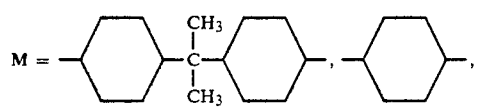

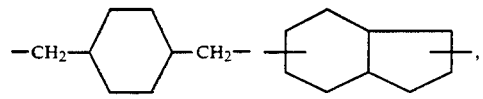

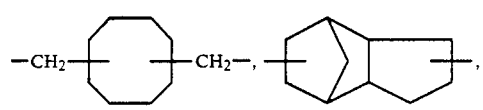

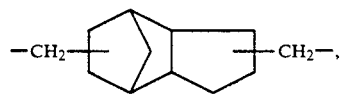

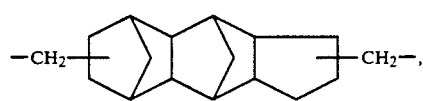

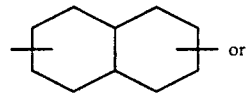

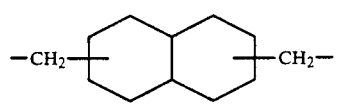

with 2 mol of a carboxylic acid anhydride corresponding to formula II and/or III and/or IV

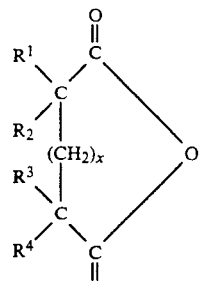

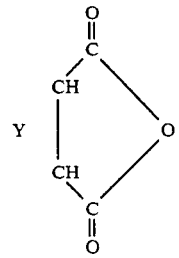

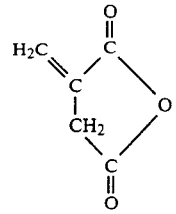

in which X=0 or 1, when x=0,

R$^1$, R$^2$, R$^3$ and R$^4$ denote hydrogen or

R$^1$ and/or R$^3$ denote C$_1$ to C$_{35}$-alkyl or alkenyl and

R$^2$ and R$^4$ and optionally R$^1$ or R$^3$ denote hydrogen or

R$^1$ and R$^4$ together denote a chemical bond and R$^2$ and R$^3$ denote hydrogen or R$^1$ and R$^4$ denote a chemical bond and R$^2$ and R$^3$ together with the carbon atoms denote an o-phenylene group, and when x=1, R$^1$, R$^2$, R$^3$ and R$^4$ denote hydrogen and

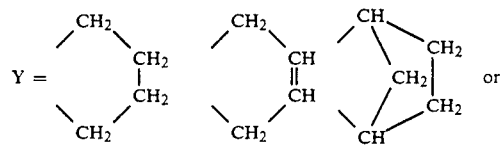

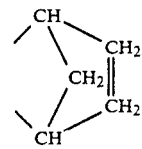

at temperatures from 100° C. to 300° C. under an inert gas followed by conversion of the reaction products into alkali metal salts or ammonium salts.

2. The thermoplastic moulding compounds according to claim 1, wherein the emulsifier is

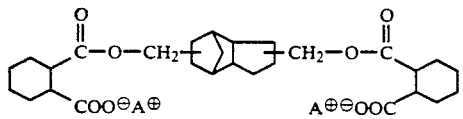
wherein A=alkali metal or ammonium.
3. Thermoplastic moulding compounds according to claim 1, wherein the emulsifier is
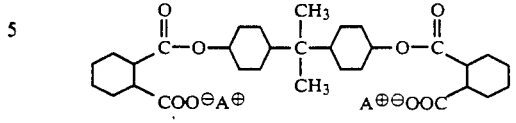
wherein A=alkali metal or ammonium.